United States Patent [19]

Nebelung

[11] Patent Number: 4,543,118
[45] Date of Patent: Sep. 24, 1985

[54] MOULD OPENING AND CLOSING MECHANISM

[75] Inventor: Hermann H. Nebelung, Zurich, Switzerland

[73] Assignee: Emhart Industries, Inc., Farmington, Conn.

[21] Appl. No.: 553,940

[22] Filed: Nov. 21, 1983

[30] Foreign Application Priority Data

Nov. 30, 1982 [GB] United Kingdom ............... 8234099

[51] Int. Cl.⁴ ............................................. C03B 9/347
[52] U.S. Cl. ....................................... 65/360; 65/357; 65/359
[58] Field of Search .................... 65/360, 357, 359

[56] References Cited

U.S. PATENT DOCUMENTS 1,911,119  5/1933  Ingle .............................. 65/360 X
3,460,931  8/1969  Rowe .............................. 65/360 X
3,591,358  7/1971  Maul et al. ........................ 65/360

Primary Examiner—Arthur Kellogg
Attorney, Agent, or Firm—H. Samuel Kieser

[57] ABSTRACT

A mould opening and closing mechanism for a plurality of mould portions of a glassware container manufacturing machine. The mechanism comprises fixed rods (26) carrying fixed pistons (30) on each of which a cylinder (32; 54) is slidably mounted. When fluid under pressure is introduced into the cylinder, the cylinder is caused to slide along the rod. The cylinder is connected to a shaft (18,20, 22,24) so that movement of the cylinder causes the shaft to turn about its longitudinal axis. The shaft is connected to a mould portion carrier so that, when the shaft turns, the mould portions are moved to open or close them.

6 Claims, 2 Drawing Figures

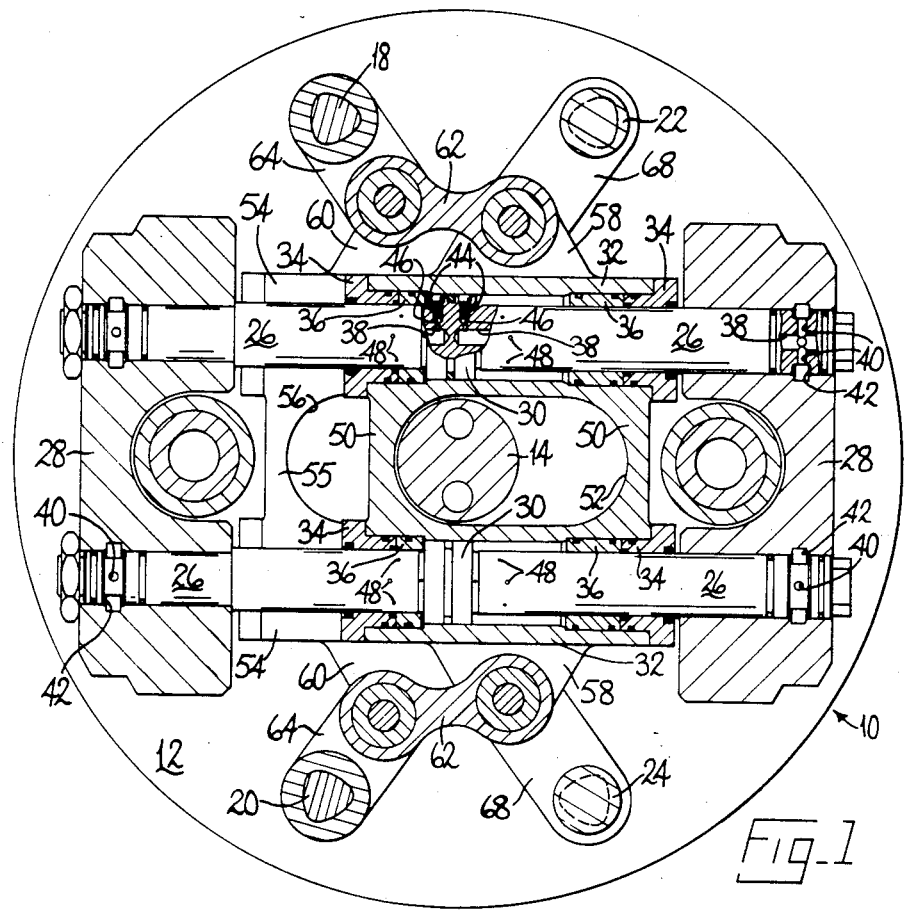
Fig_1

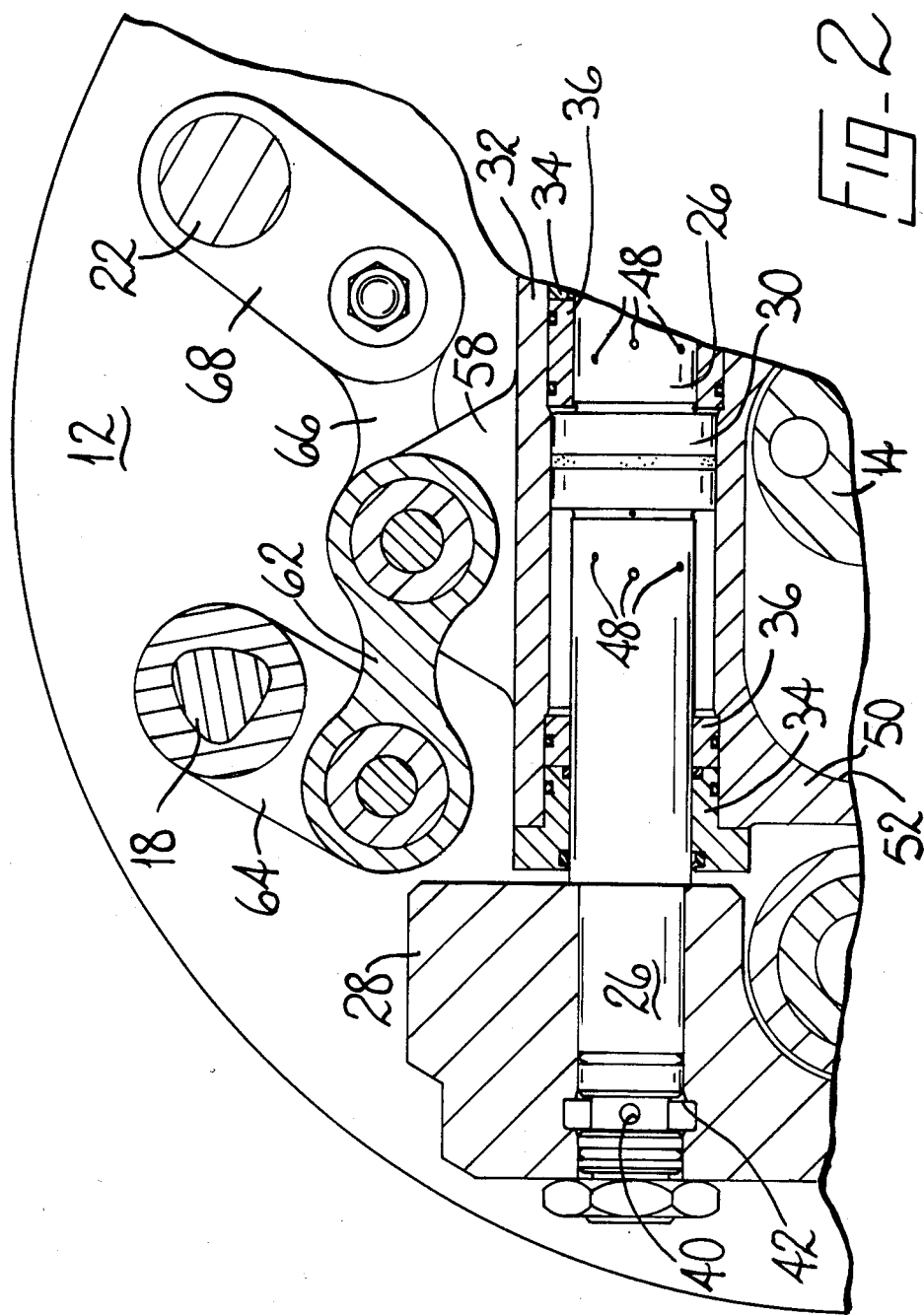

MOULD OPENING AND CLOSING MECHANISM

BACKGROUND OF THE INVENTION

This invention is concerned with a mould opening and closing mechanism for use in a glassware container manufacturing machine, the mechanism being operable to move a plurality of mould portions between mould open and mould closed positions thereof, each mould portion being mounted on a mould portion carrier which is mounted for pivotal movement about a vertically-extending axis.

In glassware container manufacturing machines of the so-called individual section type, mould portion carriers are mounted for pivotal movement about a vertically-extending axis and are moved about said axis by a mould opening and closing mechanism. The mechanism comprises a shaft associated with each mould portion carrier and mounted for turning movement about a vertically-extending longitudinal axis of the shaft, an arm fixed to and projecting from each shaft, a connection between each arm and its associated mould portion carrier such that, when the shaft is turned about its longitudinal axis, the mould portion carrier is pivoted about its axis, and turning means operable to turn the shafts about their respective axes. The turning means comprises a piston and cylinder assembly of large diameter operable to turn a bell crank which is connected to arms projecting from the shafts so that operation of the assembly causes two shafts to turn in opposite directions about their respective axes to move the mould portion carriers.

A recent innovation in glassware container manufacturing machines of the individual type is a machine in which glass parisons are formed in a parison forming mould and are transferred to one of two further moulds mounted on a turntable in which the parisons are blown into containers. The turntable is arranged to turn about a vertical axis to bring the moulds mounted thereon successively to a parison receiving position. In this type of machine, difficulty is experienced in fitting conventional mould opening and closing mechanisms as described above for two pairs of mould carriers on to the turntable because of the bulk of the mechanism.

It is an object of the present invention to provide an opening and closing mechanism which is less bulky than the conventional mechanism described above.

BRIEF SUMMARY OF THE INVENTION

The invention provides a mould opening and closing mechanism for use in a glassware container manufacturing machine, the mechanism being operable to move a plurality of mould portions between mould open and mould closed positions thereof, each mould portion being mounted on a mould portion carrier which is mounted for pivotal movement about a vertically-extending axis, the mechanism comprising a shaft associated with each mould portion carrier and mounted for turning movement about a vertically-extending longitudinal axis of the shaft, an arm fixed to and projecting from each shaft, a connection between each arm and its associated mould portion carrier such that, when the shaft is turned about its longitudinal axis, the mould portion carrier is pivoted about its axis, and turning means operable to turn the shafts about their respective axes, wherein the turning means comprises a horizontally-extending rod associated with each shaft, a piston fixed to a central region of each rod, a cylinder slidably mounted on each rod within which cylinder the piston fixed to the rod is received so that, when fluid under pressure is introduced into the cylinder, the cylinder is caused to slide along the rod, a further arm fixed to and projecting from the shaft, and a connection between said further arm and the cylinder such that, when the cylinder slides along the rod, the shaft is caused to turn about its longitudinal axis.

In a mould opening and closing mechanism as described in the last preceding paragraph, cylinders of smaller diameter can be utilised, the bell crank lever of conventional mechanism is not required and the cylinders can be arranged directly between the shafts. The mechanism is therefore less bulky than the aforementioned conventional mechanism.

Since it is normally required to move a pair of mould portion carriers simultaneously, preferably the mould portion carriers are arranged in one or more pairs, each pair carrying opposed portions of the same mould, the horizontally-extending rods of the turning means associated with the or each pair are arranged parallel to one another, and the cylinders slidable on the rods are rigidly interconnected. This arrangement also assists in preventing the mechanism from becoming jammed.

When the machine has two pairs of mould portion carriers, preferably the horizontally-extending rods of the turning means associated with a first pair being arranged parallel to one another in a first horizontal plane and the horizontally-extending rods of the turning means associated with a second pair being arranged parallel to one another in a second horizontal plane directly beneath the rods of the turning means associated with the first pair. This provides a compact arrangement.

In order to protect the connections to the cylinders, preferably each rod contains passages through which fluid under pressure can enter or leave the cylinder slidable on that rod.

In order to reduce the risk of damage to the mechanism, each passage communicates with a plurality of longitudinally-spaced ports which enter the cylinder radially so that, as the cylinder slides on the rod, the ports are successively closed so that the motion of the cylinder is cushioned.

BRIEF DESCRIPTION OF THE DRAWINGS

There now follows a detailed description, to be read with reference to the accompanying drawings, of a mould opening and closing mechanism which is illustrative of the invention. It is to be understood that the illustrative mechanism has been selected for description way of example and not of limitation of the invention.

In the drawings:

FIG. 1 is a horizontal cross-sectional view of the illustrative mechanism; and

FIG. 2 is a partial view similar to FIG. 1 but showing the illustrative mechanism in a different condition thereof.

DETAILED DESCRIPTION OF PREFERRED EMBODIMENT OF THE INVENTION

The illustrative mould opening and closing mechanism is for use in a glassware container manufacturing machine having a parison-forming station (not shown) at which parisons of molten glass are formed, a container-forming station 10 at which the parisons are formed into containers, and parison transferring means (not shown) operable to transfer parisons from the parison-forming station to the container-forming station 10. The illustrative mould opening and closing mechanism is operable at the container-forming station 10 to move a plurality of mould portions between mould open and mould closed positions thereof.

At the container-forming station 10 of the machine, four mould portion carriers (not shown) are each mounted for pivotal movement about a vertically-extending axis on a turntable 12. Two of the carriers carry mould portions of a first mould while the other two carriers carry mould portions of a second mould. The mould carriers may, however, carry mould portions of more than one mould which are moved together to open or close the moulds. The turntable is turnable about a vertical column 14 to bring the first and the second moulds successively to a parison-receiving position and to a container-releasing position. The mould carriers which carry mould portions of the same mould are mounted for pivotal movement about the same vertically-extending axis.

Each mould portion carrier of the machine is pivotally connected to a link (not shown) which forms a connection between the carrier and an arm (not shown) fixed to and projecting from a shaft of the illustrative mechanism. The illustrative mechanism thus has four shafts, one associated with each mould portion carrier, the shafts associated with the mould portion carriers of the first mould being numbered 18 and 20 and the remaining shafts being numbered 22 and 24. Each shaft 18, 20, 22 and 24 is mounted on the turntable 14 for turning movement about a vertically-extending longitudinal axis of the shaft 18, 20, 22 and 24. The connection formed by the link between the carrier and the arm is such that, when the shaft 18, 20, 22 or 24 is turned about its longitudinal axis, the carrier is pivoted about its axis and a mould portion on the carrier is moved between mould open and mould closed positions thereof.

The illustrative mould opening and closing mechanism also comprises turning means operable to turn the shafts 18, 20, 22 and 24 about their respective axes. The turning means of each shaft 18, 20, 22 and 24 is similar so that only that of the shaft 18 will be described in detail. Like parts associated with the shafts 18 and 20 are given the same reference numbers. However, in some cases those parts which are associated with the shafts 22 and 24 are given the same reference numbers but different from the reference numbers of the parts associated with the shafts 18 and 20.

The turning means of the shaft 18 comprises a horizontally-extending rod 26 which extends between two upstanding frame members 28 mounted on the turntable 12 and is supported thereby. A piston 30 of the turning means is fixed to a central region of the rod 26, the piston 30 not being exactly halfway between the frame members 28 for reasons that will become apparent. A cylinder 32 of the turning means is slidably mounted on the rod 26 within which cylinder the piston 30 is received so that the piston 30 and the cylinder 32 form a piston and cylinder assembly. The cylinder 32 has two end caps 34 which are a sliding fit on the rod 26 and its sliding movement along the rod 26 is limited by engagement of spacing rings 36 contained within the cylinder 32 and attached to the end cap 34 with the piston 30. The arrangement is such that, when hydraulic fluid under pressure is introduced into the cylinder 32, the cylinder 32 is caused to slide along the rod 26.

In order to introduce fluid under pressure into the cylinder 32, the rod 26 contains two longitudinally-extending passages 38 which enter the rod 26 from opposite ends thereof and through which fluid under pressure can enter or leave the cylinder 32. Each passage 38 communicates through radial passages 40 with an annular space 42 formed between the rod 26 and one of the frame members 28. The space 42 is connected by passages (not shown) through the frame member 28 to valves (not shown) which control entry or exit of fluid. Each passage 38 communicates with a port 44 which enters the cylinder 32 through the piston 30 and contains a non-return valve 46 which prevents fluid from leaving the cylinder 32 through the port 44. Each passage 38 also communicates with a plurality of longitudinally spaced ports 48 which enter the cylinder 32 radially so that, as the cylinder 32 slides on the rod 26, the ports 48 are successively closed by being covered by the spacing ring 36. When fluid is exhausted from the cylinder 32 through the ports 48, the spacing ring 36 progressively throttles the exhaust by closing the ports 48 and the motion of the cylinder 32 is cushioned.

Viewing FIG. 1, when it is desired to move the cylinder 32 to the left from the position in which it is shown, fluid under pressure is introduced into the left hand passage 38 while the right hand passage 38 is connected to exhaust. The fluid enters the cylinder 32 through the left hand port 44 and leaves through the right hand ports 48. As the cylinder 32 approaches its left hand position (shown in FIG. 2), the right hand ports 48 are successively closed by the right hand ring 36 so that fluid leaving the cylinder 32 meets increasing resistance and the motion of the cylinder 32 is cushioned. For movement of the cylinder 32 to the right, the connections to the passages 38 are reversed.

As described above, the shafts 18 and 20 are associated with a first pair of the mould carriers which carry opposed mould portions of a first mould. The rods 26 of the turning means of the shafts 18 and 20 are arranged parallel to one another in a first horizontal plane. Furthermore, the cylinders 32 which are slidable on these rods 26 are rigidly interconnected by a bridge member 50 which contains a clearance slot 52 around the column 14. This ensures that the two cylinders 32 associated with the shafts 18 and 20 move together.

The two rods 26 associated with the shafts 22 and 24 (not visible in the drawings) are arranged parallel to one another in a second horizontal plane directly beneath the rods 26 associated with the shafts 18 and 20. The rods 26 associated with the shafts 22 and 24 have cylinders 54 similar to the cylinders 32 sliadable along them. The cylinders 54 are interconnected by a bridge member 55, similar to the bridge member 50, which has a clearance slot 56 in it.

Each of the cylinders 32 and 54 has a boss projecting sideways therefrom, the bosses of the cylinders 32 being numbered 58 and those of the cylinders 54 being numbered 60. The bosses 58 are each pivotally connected to one of two links 62 which are in turn each pivotally connected to a further arm 64 which is fixed to and projects from one of the shafts 18 or 20. The bosses 60 are each pivotally connected to one of two links 66 (FIG. 2) which are, also pivotally connected to arms 68 fixed to and projecting from the shafts 22 and 24. The links 62 and 66 form connections between the arms 64 and 68 and the cylinders 32 and 54 such that, when the cylinders 32 and 54 slide along the rods 26, the shafts 18, 20, 22 and 24 are caused to turn about their respective longitudinal axes thereby moving the mould carriers.

The shafts 18, 20, 22 and 24 are arranged at the corners of a rectangle with the shafts 18 and 20 associated with a first mould to the left (viewing FIG. 1) of a central line of symmetry of the mechanism passing through the column 14 normally of the rods 26. The shafts 22 and 24 are to the right of this line of symmetry and so, in order to achieve symmetrical operation of the mechanism the pistons 30 of the cylinders 32 are to the left of the line of symmetry while the pistons 30 of the cylinders 54 are to the right of the line of symmetry.

The illustrative mechanism is compact and fits readily on the turntable.

I claim:

1. A mould opening and closing mechanism for use in a glassware container manufacturing machine, the mechanism being operable to move a plurality of mould portions between mould open and mould closed positions thereof, each mould portion being mounted on a a mould portion carrier which is mounted for pivotal movement about a vertically-extending axis, the mechanism comprising a shaft associated with each mould portion carrier and mounted for turning movement about a vertically-extending longitudinal axis of the shaft, an arm fixed to and projecting from each shaft, a connection between each arm and its associated mould portion carrier such that, when the shaft is turned about its longitudinal axis, the mould portion carrier is pivoted about its axis, and turning means operable to turn the shafts about their respective axes, wherein the turning means comprises a horizontally-extending rod associated with each shaft, a piston fixed to a central region of each rod, a cylinder slidably mounted on each rod within which cylinder the piston fixed to the rod is received so that, when fluid under pressure is introduced into the cylinder, the cylinder is caused to slide along the rod, a second arm fixed to and projecting from the shaft, and a third arm pivotally connected to said second arm and the cylinder such that, when the cylinder slides along the rod, the shaft is caused to turn about its longitudinal axis.

2. A mould opening and closing mechanism according to claim 1, wherein the mould portion carriers are arranged in one or more pairs, each pair carrying opposed portions of the same mould, and horizontally-extending rods of the turning means associated with the or each pair are arranged parallel to one another, and the cylinders slidable on the rods are rigidly interconnected.

3. A mould opening and closing mechanism according to claim 2, wherein there are two pairs of mould portion carriers, the horizontally-extending rods of the turning means associated with a first pair being arranged parallel to one another in a first horizontal plane and the horizontally-extending rods of the turning means associated with a second pair being arranged parallel to one another in a second horizontal plane directly beneath the rods of the turning means associated with the first pair.

4. A mould opening and closing mechanism according to any one of claims 1 to 3, wherein each rod contains passages through which fluid under pressure can enter or leave the cylinder slidable on that rod.

5. A mould opening and closing mechanism according to any one of claims 1 to 3, wherein each rod contains passages through which fluid under pressure can enter or leave the cylinder slidable on that rod and wherein each passage communicates with a plurality of longitudinally-spaced ports which enter the cylinder radially so that, as the cylinder slides on the rod, the ports are successively closed so that the motion of the cylinder is cushioned.

6. A mould opening and closing mechanism according to any one of claims 1 to 3, wherein the mechanism is mounted on a turntable for turning movement about a vertically-extending axis, the mould portion carriers also being mounted on the turntable.

* * * * *